United States Patent [19]

Ruiz

[11] Patent Number: 5,605,370
[45] Date of Patent: Feb. 25, 1997

[54] WINDOW SHADE AND VEHICLE WINDOW COMBINATION

[76] Inventor: Carmelo C. Ruiz, 725 W. Jackson St., Morris, Ill. 60450

[21] Appl. No.: 192,530

[22] Filed: Feb. 7, 1994

[51] Int. Cl.⁶ .................. B60J 1/20; B60J 3/00
[52] U.S. Cl. .................. 296/152; 296/97.8; 160/370.22
[58] Field of Search .................. 296/152, 143, 296/97.8, 97.5, 146.2, 146.16; 160/370.24, 100, 99; 49/490.1, 489.1, 483.1, 501, 502

[56] References Cited

U.S. PATENT DOCUMENTS

| | | | |
|---|---|---|---|
| 3,025,098 | 3/1962 | Andrews | 296/152 |
| 3,183,033 | 5/1965 | Stulbach | 296/97 |
| 4,692,969 | 9/1987 | Johnson | 24/573 |
| 4,744,570 | 5/1988 | Kranz | 49/490.1 X |
| 5,042,550 | 8/1991 | Yee | 296/97.1 X |
| 5,089,912 | 2/1992 | Simin | 296/97.8 X |

FOREIGN PATENT DOCUMENTS

| | | | |
|---|---|---|---|
| 3617427 | 8/1987 | Germany | 296/152 |
| 0394190 | 10/1990 | Germany | 296/95.1 |

*Primary Examiner*—David M. Mitchell
*Assistant Examiner*—Kia M. Robinson
*Attorney, Agent, or Firm*—Ernest Kettelson

[57] ABSTRACT

A vehicle shade and vehicle window combination comprises a vehicle side panel having a window recess and a window which may be lowered into such window recess and raised therefrom to a window closed position, a window opening in the vehicle side panel having a window opening bottom wall, window opening top wall, and window opening side walls, the window recess opening to the window opening bottom wall, a window shade recess between the window recess and inner wall of the vehicle side panel also opening to the window opening bottom wall, a wind-up roller secured in the window shade recess, one end of a flexible sheet shade member secured to the wind-up roller, its other free end being liftable to the window opening upper wall and having one or more eyelets to receive corresponding hook members on a rib member secured to the upper edge of the vehicle window. The shade when so connected to the upper edge of the vehicle window can be raised and lowered by raising and lowering the vehicle window.

6 Claims, 6 Drawing Sheets

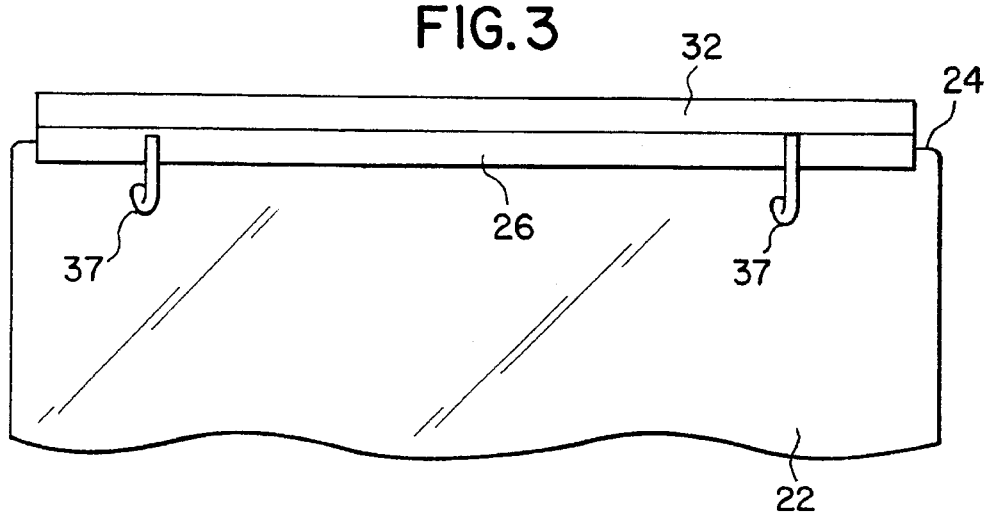
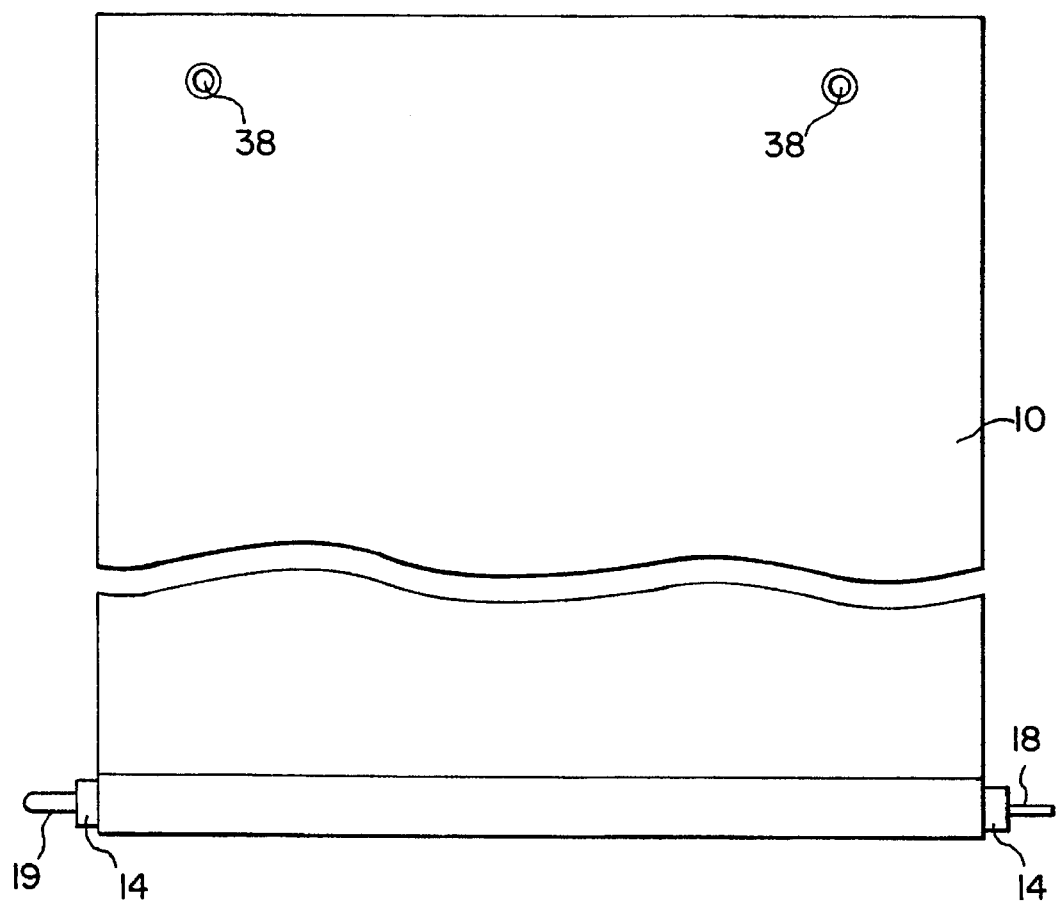

WINDOW SHADE AND VEHICLE WINDOW COMBINATION

BACKGROUND OF THE INVENTION

This invention relates to the field of window shades for vehicle windows of the type that are primarily used to shade the side windows of the vehicle.

Prior art window shades for vehicle windows of which the inventor is aware include those described in the following United States patents.

U.S. Pat. No. 5,067,546 discloses a roller blind for a motor vehicle comprising a housing with a curved guide slot through which a strip of flexible material extends fixed to a roller for winding up thereon, and a curved pull bar affixed to the free end of the blind.

U.S. Pat. No. 4,979,775 discloses a window shade primarily for a vehicle windshield, comprising a shade strip and a winding shaft being axially displaced when the shade strip is pulled past a window or wound back onto the shaft.

U.S. Pat. No. 4,898,224 discloses a rear window shade assembly for the rear window of a vehicle, comprising a base which can be set on a back-seat shelf of an automobile with a roll shade mechanism, a winch, and an angularly adjustable crane arm mounted thereon. A cord extends from the winch along the crane arm and is attached to the outer free end of a shade on the roll shade mechanism for extending and retracting the shade.

U.S. Pat. No. 4,869,542 discloses a sun visor device for shading the rear window of an automobile, comprising a seat, a shade roller having an elongated cylindrical housing and a retractable shade body received in the cylindrical housing, a gripping member and a stay rod. The seat and gripping member are mounted on a platform located under the rear window of the automobile and an inside rubber bib connected to the roof panel of the automobile and biased by a stay rod connected therebetween. The sun visor device can be installed and removed without drilling holes in the interior surface of the automobile.

U.S. Pat. No. 4,836,263 discloses a window screen or shade for motor vehicles comprising a wind-up roller biased in the wind-up direction to which one end of a screen or shade is secured. The other end is mounted in an end rail which may be pushed upwardly by a pair of levers. The levers are pivoted to a support member at each opposite end of the roller, and they have their outer free ends in bearing engagement against the end rail. As their free ends are pivoted upwardly, they push the end rail and shade member upwardly against the bias of the wind-up roller in the opposite direction.

U.S. Pat. No. 4,758,041 discloses a glare protection device for use with the rear window of passenger cars, comprising laterally separated flexible guide rails, a pull bar fixed to one edge of a sunscreen, the other edge of the sunscreen being fixed to a roll bar, a pair of hold bars slidably received in the end portions of the pull bar, each of the hold bars engaging respective ones of the guide rails.

U.S. Pat. No. 4,707,018 discloses a free standing sunshade assembly to be attached to a motor vehicle, comprising a shade housing having an internal sunshade roller which stores the shade material, the shade being positioned and maintained in a desired extended or retracted position through use of an elongated stiffener tape member having a crowned cross-sectional shape which provides bending stiffness. The stiffener tape is stored by coiling within a stiffener tape housing and is extended and retracted along with the shade material.

U.S. Pat. No. 4,335,773 discloses a wind-up curtain for motor vehicles comprising a sheet of flexible opaque material having a plurality of holes and attached to a wind-up shaft carried by end supports. A semi-cylindrical casing is parallel to the wind-up shaft to permit a hand grip member to be rotated, when mounted, from one side to the other of the casing.

U.S. Pat. No. 2,594,386 discloses an anti-glare shade for windshields comprising a mounting device to mount the shade assembly on the dashboard along the bottom edge of the windshield, a wind-up roller supported on the mounting device, a flexible sheet shade member having one end secured to the wind-up roller, an eyelet in the center of the opposite end of the shade member to receive one of the lugs of a retaining member secured to the upper edge of the windshield.

U.S. Pat. No. 1,677,287 discloses an apparatus for adjusting automobile curtains, comprising an assembly of pulleys and cords which are connected to curtains to the rear of the driver, with a portion of the cord within reach of the driver so he can raise or lower the curtains to his rear from the driver's seat.

OBJECT OF THE INVENTION

The window shade and vehicle window combination in accordance with the present invention is an improvement over prior art devices disclosed in the foregoing patents. It includes a window shade recess opening to the bottom wall of the window opening in the side door or side panel of a vehicle, in which a spring biased wind-up roller is mounted by the usual trunnions at each end, one being flat and received in a flat sided slot in a side wall of the recess to hold an end of the inner coil spring while the roller is being rotated in the unwind direction, the other trunnion being cylindrical and received for rotation in a corresponding slot in the opposite side wall of the window shade recess. A flexible sheet shade member has one end secured to the wind-up roller. An elongated rib member is secured to the upper edge of the wind-up vehicle window, the rib member having an elongated rib of compressible material to be snugly received in the elongated recess in the upper wall of the vehicle window opening when the wind-up vehicle window is moved upwardly to its closed position.

The elongated rib member includes hook members to be received in corresponding eyelets in the upper end region of the flexible sheet shade member. When the vehicle window is moved upwardly to its closed position, the shade member which is secured to the rib member along the upper edge of the vehicle window by the hook and eyelet fasteners is automatically pulled upwardly to cover and shade the vehicle window in its closed position.

When the vehicle window is rolled down, the spring biased wind-up roller draws the shade member into its retracted position within the window shade recess adjacent the window recess.

BRIEF DESCRIPTION OF THE DRAWING

FIG. 3 is a side elevation view of the rib member secured to the upper edge of the vehicle window, the upper fragment of the window being shown.

FIG. 4 is a side elevation view of the shade member and wind-up roller to which one end is secured.

DESCRIPTION OF PREFERRED EMBODIMENT

Figure 1:
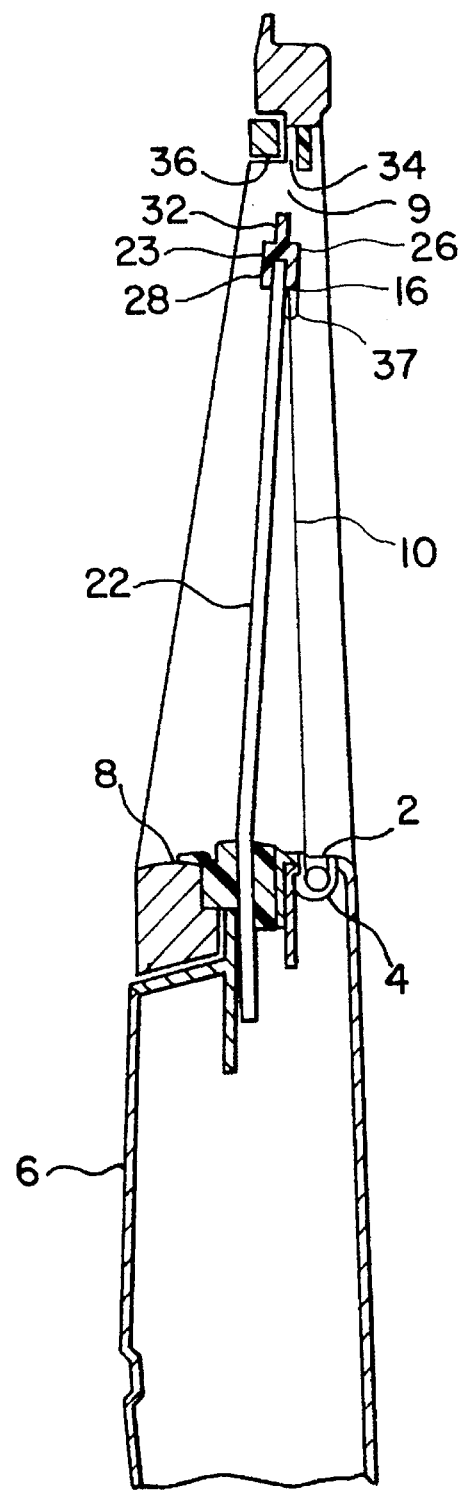
FIG. 1 is a partial section view of a vehicle door assembly having the vehicle window shade and vehicle window combination in accordance with this invention, showing hook members facing toward the vehicle window through eyelets in the window shade to hold it in place covering the window, which is shown partially open.
Figure 2:
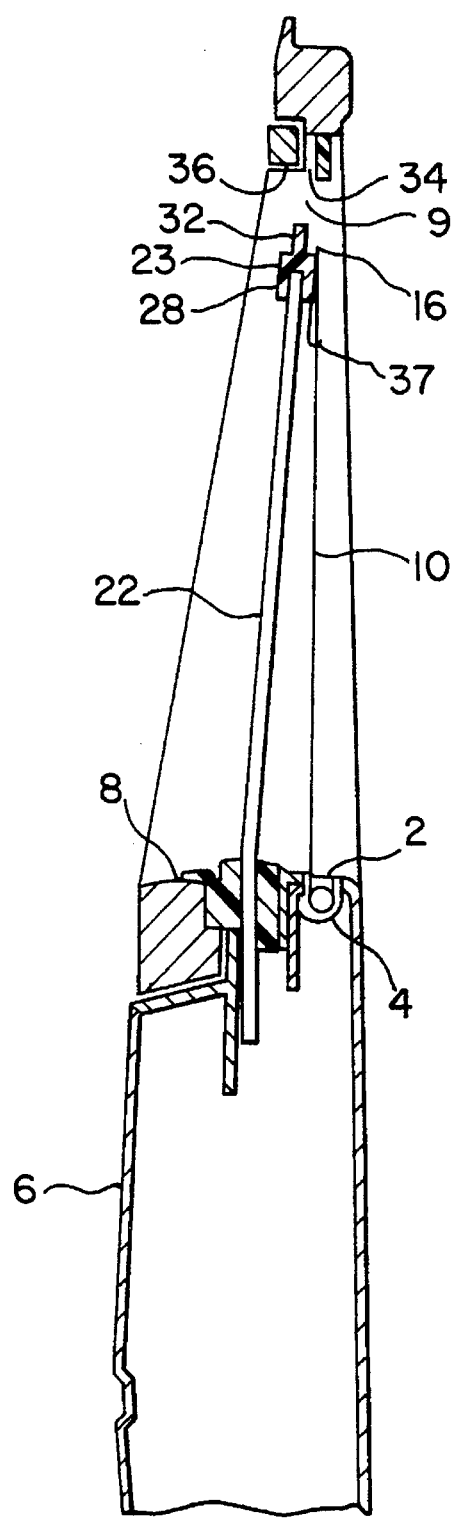
FIG. 2 is a partial section view as in FIG. 1 showing the shade in its window covering position when the hooks are facing the opposite direction from that shown in FIG. 1.
Figure 5:
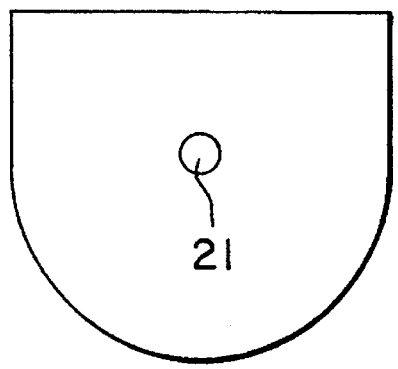
FIG. 5 is an elevation view of one end wall of the window shade recess.
Figure 6:
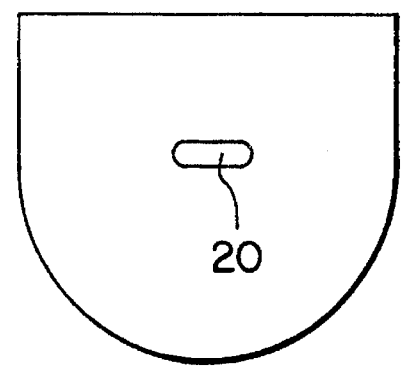
FIG. 6 is an elevation view of the opposite end wall of the window shade recess.
Figure 7:
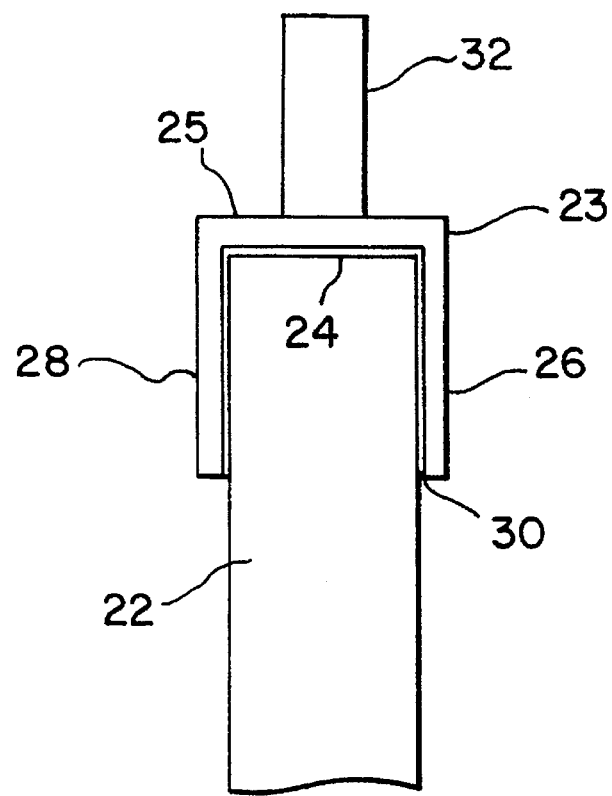
FIG. 7 is an end elevation view of the rib member secured to the upper edge of the vehicle window, the upper fragment of the window being shown.
Figure 8:
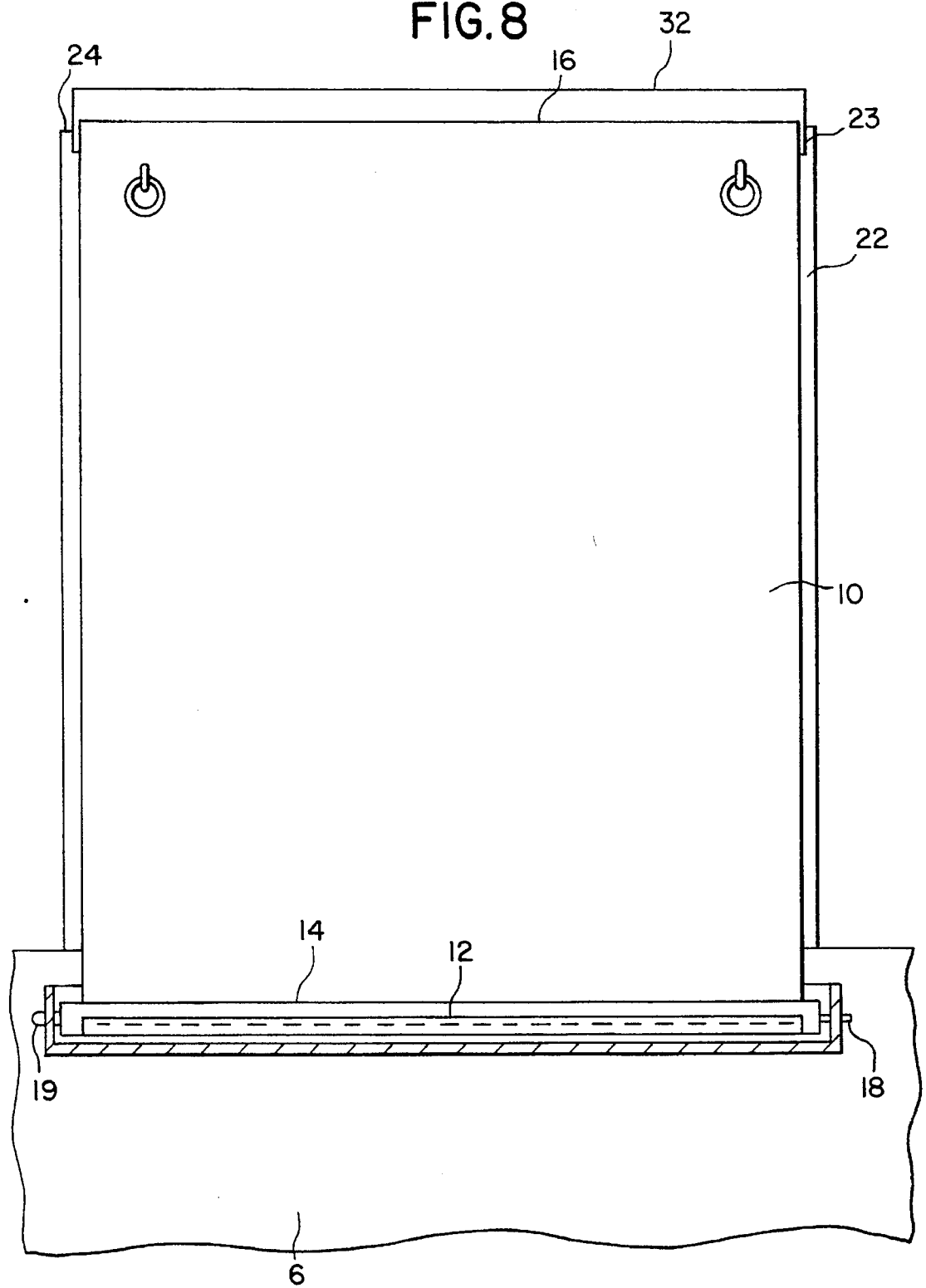
FIG. 8 is a side elevation view of the window shade in its fully extended position, the inner wall of the vehicle door assembly being removed to view the window shade recess, such recess being partially in section to view the wind-up roller and the end of the shade member secured thereto.
Figure 9:
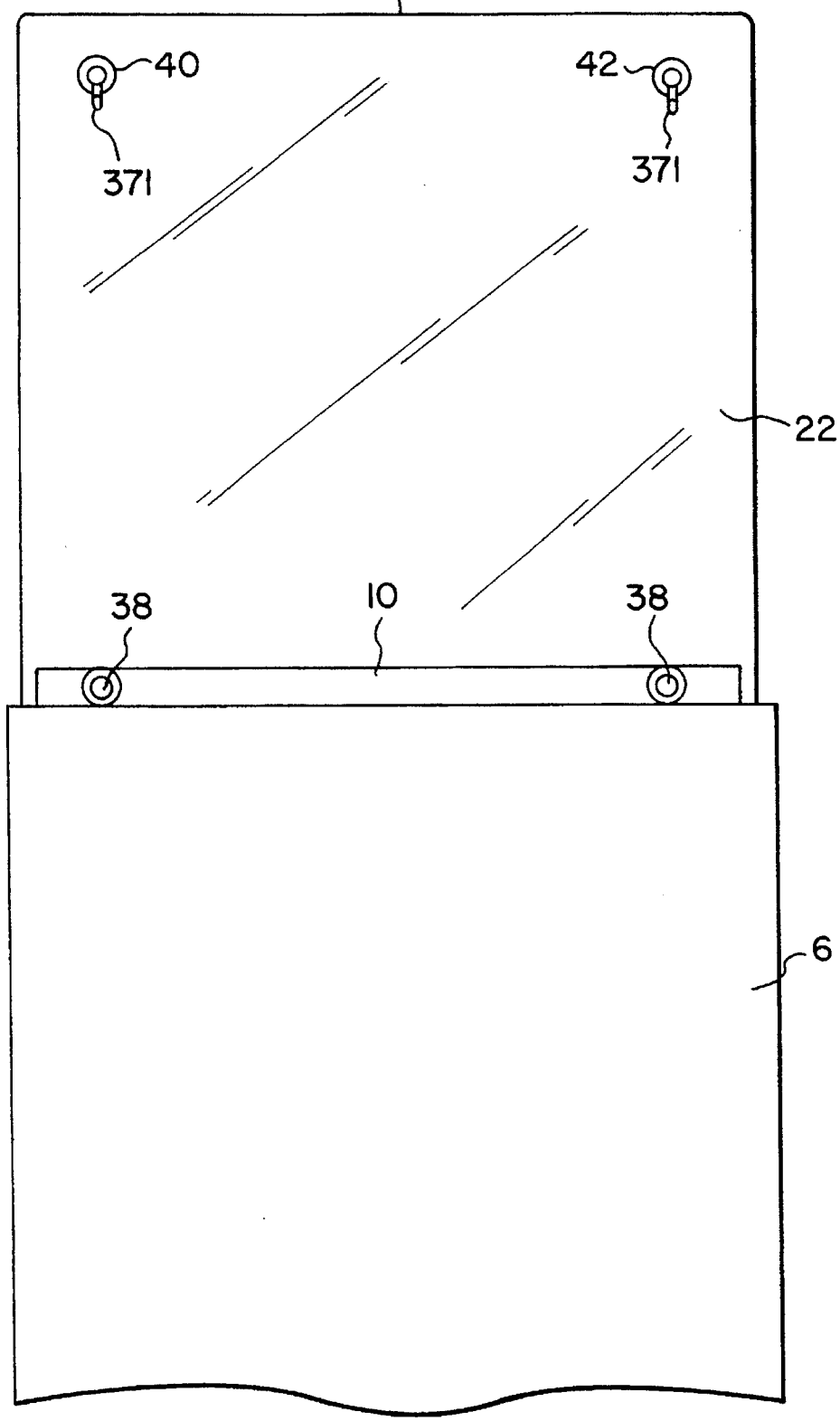
FIG. 9 is an elevation view of a modified form of the invention wherein a pair of suction cups are secured to the vehicle window along its upper edge, one shown adjacent the edge of the window to the left, the other shown adjacent the edge of the window to the right, each suction cup shown with a hook member secured thereto.

A window shade for autos in accordance with this invention comprises a retractable and extendable window shade assembly 2 mounted in a horizontally extending window shade recess 4 of the vehicle door assembly 6 opening to the bottom wall 8 of the door window opening 9. The window shade assembly 2 includes a window shade member 10 of flexible sheet material having an attached end 12 secured to an elongated horizontally extending spring biased roller 14 secured in the recess 4 and a free end 16 which may be pulled upward to the fully extended position of the shade member 10 and is biased downwardly by the shade member's attachment to the spring biased roller 14 to the fully rolled up and retracted position of the shade member 10.

The spring biased roller 14 is secured in the window shade recess 4 by an outwardly projecting flat surface lug 18 extending out from one end of the roller 14 and a cylindrical lug 19 at the opposite end to seat in corresponding receiving slots 20 and 21, slot 20 having flat sides and slot 21 having a circular side wall. The lug 18 is held from rotation when seated in slot 20 and lug 19 is free to rotate when received in slot 21. The lug 18 is connected to the coil spring within the wind-up spring biased roller 14, whereby the coil spring is compressed and tensioned when the roller 14 is rotated in the unwind direction of rotation. As the window shade member 10 is pulled upwardly toward its extended position, the roller 14 is rotated in the direction of rotation which increases the bias of its inner coiled spring toward the opposite direction of rotation. Thus, when the free end 16 of the shade member 10 is released, the spring biased roller 14 rotates in the opposite direction to automatically roll the window shade member 10 up on the roller 14 until it reaches its fully rolled up and retracted position.

The horizontally extending window shade recess 4 and window shade assembly 2 are positioned adjacent and inwardly of the vehicle window 22 which is mounted in the vehicle door assembly 6 for movement upwardly to a closed position and downwardly to an open position.

An elongated rib member 23 is placed over the upper horizontal edge 24 of the vehicle window 22. The rib member 23 comprises an elongated securing portion comprising an inverted U-shape having an elongated top wall 25, an inwardly facing elongated side wall 26 and a spaced apart outwardly facing elongated side wall 28 with an elongated window receiving slot on elongated groove 30 therebetween. The upper horizontal edge 24 of the vehicle window 22 is snugly received in the slot 30 and may be permanently secured therein by an adhesive or other securing means.

The rib member 23 also includes an elongated rib 32 extending upwardly from the top wall 25 of the rib member 23 to snugly seat in the elongated horizontally extending upper vehicle door recess 34 of the upper wall 36 of the door window opening 9.

The cross-sectional dimension of the slot 30 is substantially the same as the cross-sectional dimension of the upper horizontal edge 24 of the vehicle window 22 for a snug fit of the window 22 in the slot 30.

The cross-sectional dimension of the upper vehicle door recess 34 is substantially the same as the cross-sectional dimension of the elongated rib 32 for a snug fit of the rib 32 in the upper vehicle door recess 34. The rib 32 is preferably made of a compressible material such as rubber or any compressible natural or synthetic material which compresses as the rib 32 is received in the upper vehicle door recess 34 to provide a substantially air tight seal.

A pair of hook members 37 are provided on the inwardly facing side wall 26 of the elongated rib member 23 to inter-connect with the corresponding pair of eyelet members 38 on the shade member 10 when it is in its fully extended position to cover the vehicle window 22. The eyelet members 38 are positioned on the shade member 10 at a location downwardly from the free end 16 thereof a sufficient distance for the free end 16 to reach the top of the window opening 9, the upper edge 24 of the vehicle window 12, and the top wall 25 of the rib member 23, when the hook members 37 of rib member 22 are received in respective ones of the eyelet members 38 on the shade member 10.

When the window shade member 10 is connected to the vehicle window 22 by interconnection of the hook members 37 and eyelet members 38, it may be raised to a closed and shading position by rolling up the vehicle window 22. It may be lowered to the open and unshaded position by rolling the vehicle window 22 down.

The window shade member 10 may be disconnected from the vehicle window 22 by releasing the hook members 37 from the eyelet members 38 and leaving the shade member 10 rolled up within the window shade recess 4 where it remains out of the way until it is desired to be used again.

The window shade recess 4 and window shade assembly 2 are specifically described herein and shown in the drawing as being in a vehicle door assembly 6. They may also be provided in a vehicle side panel which does not open and close but which has a window opening 9 and a window 22. Thus, a window shade recess 4 and a window shade assembly 2 in accordance with this invention may be provided for all of the side windows of a vehicle.

In a modified form of the invention, the rib member 23 is dispensed with and suction cups 40 and 42 are pressed into position against the vehicle window 22 along its upper edge 24, suction cup 40 being adjacent one side edge of the window 22 and suction cup 42 being adjacent the opposite side edge.

Hook members 371 are secured to the suction cups 40 and 42. The eyelet members 38 on the shade member 10 hook into the hook members 371 whereupon as the vehicle window 22 is moved upwardly to its window closed position the shade member 10 is drawn upwardly to the window closed and shading position.

I claim:

1. A window shade and vehicle window combination, said vehicle window comprising a window opening in a side wall portion of a vehicle including a horizontally extending lower window opening wall, vertically extending side window opening walls, and a horizontally extending upper window opening wall, said side wall portion of said vehicle including an outwardly facing vehicle side wall, an inwardly facing vehicle side wall spaced apart inwardly from said outwardly facing vehicle side wall, a window receiving recess in said side wall portion between said outwardly and inwardly facing vehicle side walls, said window receiving recess opening to said lower window opening wall, a transparent vehicle window positioned for movement downwardly into said window receiving recess to an open position and upwardly out of said window receiving recess to a closed position covering said window opening, window operating means to move said vehicle window between its said open and closed positions, a window shade recess in said side wall portion between said vehicle window and said inwardly facing vehicle side wall and opening to said lower window opening wall, a retractable and extendable shade assembly in said window shade recess, said window shade assembly comprising a window shade positioned for movement into said window shade recess to a retracted position and out of said window shade recess to an extended position, window shade operating means for movement of said window shade out of said window shade recess to its said extended position and into said window shade recess to its said retracted position, said window shade being adjacent to said vehicle window to cover it when said vehicle window is moved to its said closed position and said window shade is moved to its said extended position, wherein said window shade operating means includes a biasing member to bias said window shade toward the said retracted position of said window shade, wherein said horizontally extending upper window opening wall includes an elongated window receiving slot which extends the full length between said vertically extending side window opening walls to normally and snugly receive the upper edge of said vehicle window when in its said closed position, an elongated rib member comprising a securing portion to secure to the said upper edge of said vehicle window and an elongated rib extending upwardly from said securing portion of said elongated rib member, said upwardly extending elongated rib extending the full length of said elongated window receiving slot and having a cross-sectional dimension corresponding to that of said upper edge of said vehicle window for snug reception of said elongated rib in said elongated window receiving slot when said vehicle window is in its said closed position with said elongated rib member secured to the said upper edge of said vehicle window, first cooperative fastening means on said elongated rib member to releasably fasten said upper end of said window shade panel thereto when in its said extended position and when said vehicle window is in its said closed position, and second cooperative fastening means on said window shade to releasably interconnect with said first cooperative fastening means on said elongated rib member.

2. A window shade and vehicle window combination as set forth in claim 1, wherein said securing portion of said elongated rib member comprises a pair of spaced apart elongated side walls, an elongated groove between said spaced apart side walls to receive the said upper edge of said vehicle window therein, means to retain said upper edge of said vehicle window in said elongated groove, said securing portion of said elongated rib member including a rib member top wall extending between the upper ends of said spaced apart side walls, said elongated rib extending upwardly from said rib member top wall in line with the central axis of said elongated groove.

3. A window shade and vehicle window combination as set forth in claim 1, wherein said first cooperative fastening means on said elongated rib member includes at least one hook member.

4. A window shade and vehicle window combination as set forth in claim 3, wherein said second cooperative fastening means on said window shade includes at least one eyelet member.

5. A window shade and vehicle window shade combination as set forth in claim 3, wherein said upwardly extending elongated rib is made of a compressible material which compresses when received in said elongated window receiving slot of said upper window opening wall to provide a substantially air tight seal when said vehicle window is in its said closed position.

6. A window shade and vehicle window combination as set forth in claim 4, wherein said eyelet member on said window shade is spaced apart downwardly from the upper edge of said window shade a sufficient distance for said upper edge of said window shade to reach said upper window opening wall and thereby completely cover said vehicle window and said window opening when said hook member on said elongated rib member is received in said eyelet member on said window shade.

* * * * *